United States Patent [19]

Geno et al.

[11] Patent Number: 4,712,776
[45] Date of Patent: Dec. 15, 1987

[54] AIR SPRING SUSPENSION SYSTEM

[75] Inventors: Wayne H. Geno, Cicero, Ind.; David A. Weitzenhof, Akron, Ohio

[73] Assignee: The Firestone Tire & Rubber Company, Akron, Ohio

[21] Appl. No.: 885,124

[22] Filed: Jul. 14, 1986

[51] Int. Cl.⁴ ............................................. F16F 9/04
[52] U.S. Cl. ............................ 267/64.21; 188/322.12; 267/64.24
[58] Field of Search .............. 267/64.19, 64.21, 64.23, 267/64.24, 64.27, 8 R; 280/668, 709, 711; 188/322.12; 92/168 B; 277/212 FB

[56] References Cited

U.S. PATENT DOCUMENTS

| | | | |
|---|---|---|---|
| Re. 31,184 | 3/1983 | Lederman | 280/668 |
| 2,859,047 | 11/1958 | Easton | 280/7.12 |
| 3,954,257 | 5/1976 | Keijzer | 267/64.21 |
| 4,206,934 | 6/1980 | McKee | 280/711 |
| 4,256,292 | 3/1981 | Sullivan, Jr. et al. | 267/8 R |
| 4,274,655 | 6/1981 | Lederman | 267/8 R |
| 4,518,154 | 5/1985 | Merkle | 267/34 |
| 4,555,096 | 11/1985 | Pryor | 267/64.21 |
| 4,592,540 | 6/1986 | Yokoya et al. | 267/64.24 |

FOREIGN PATENT DOCUMENTS 2100338 8/1972 Fed. Rep. of Germany .
0241538 11/1958 Japan ........................... 267/64.21

Primary Examiner—Andres Kashnikow
Attorney, Agent, or Firm—Ronald Brietkrenz

[57] ABSTRACT

A suspension system for a vehicle having a shock absorber strut with a reciprocal piston rod located within a cylinder, and attachments for securing the piston rod and cylinder to spaced parts of the vehicle. An air spring includes a rigid annular canister mounted on the piston rod by a resilient rotatable mount. The canister forms a fluid pressure chamber in conjunction with a flexible diaphragm, one end of which is sealingly connected to the cylinder by an annular rigid sleeve which forms an air spring piston. The flexible diaphragm has inner and outer radially spaced portions connected by a rolling portion. A rigid member resembling a cutaway can is mounted on the rigid canister portion of the air spring and extends about a predetermined portion of the outer portion of the flexible diaphragm and restrains outward expansion of said portion. Restriction of the outward expansion of only a portion of the flexible diaphragm exerts a lateral force on the strut to counteract the unbalanced lateral forces acting thereon due to the offcenter mounting of the strut with respect to the point of contact of the vehicle wheel with the pavement.

20 Claims, 10 Drawing Figures

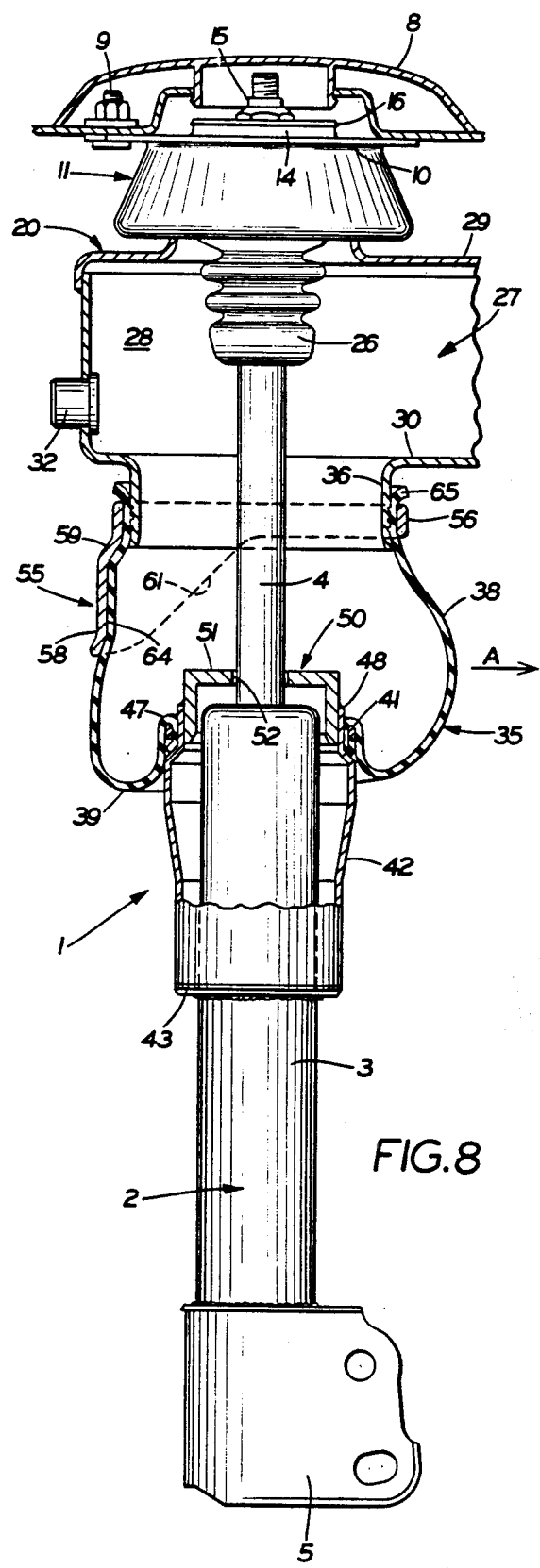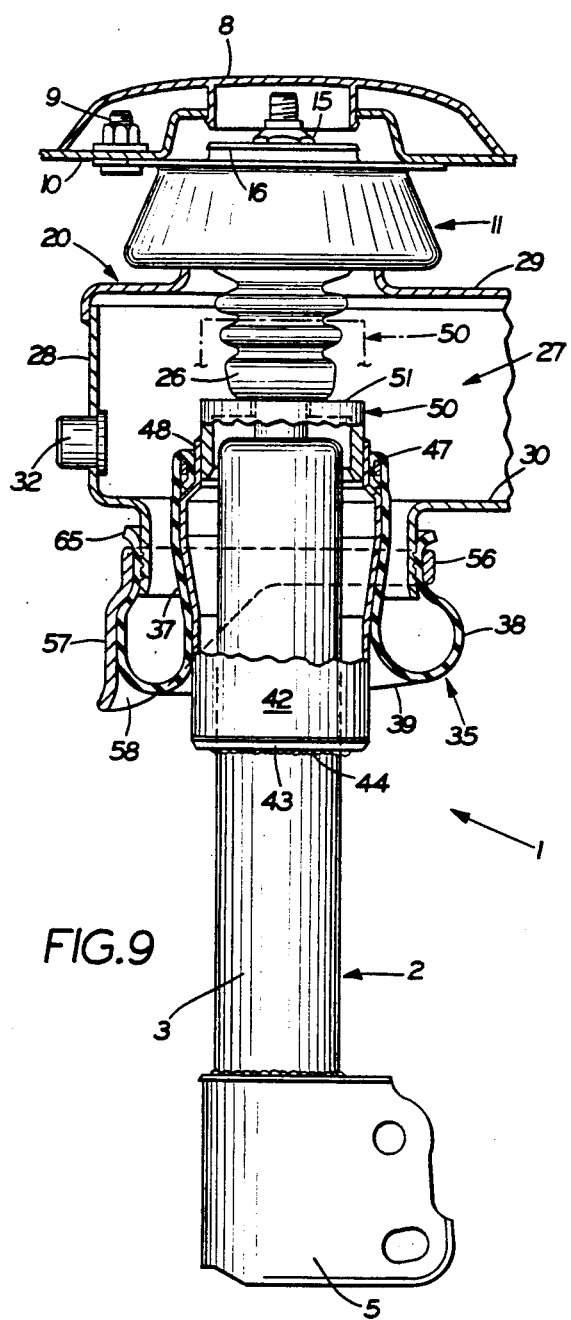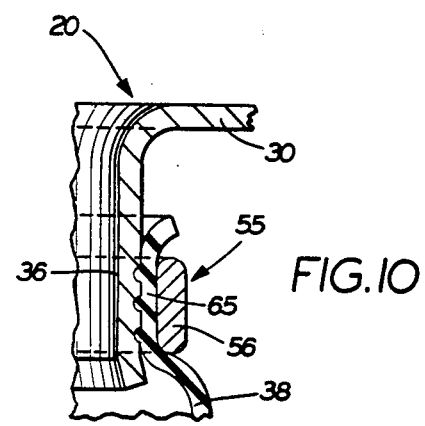
FIG.8
FIG.9
FIG.10

AIR SPRING SUSPENSION SYSTEM

TECHNICAL FIELD

The invention relates generally to vehicle suspension systems and in particular to an improved vehicle suspension system including an air spring in combination with a strut-type fluid shock absorber, and more particularly to such a suspension system which provides offset loading on the shock absorber strut to counteract bending movement caused by the vertical load at tire contact patch which is offset from the strut centerline.

BACKGROUND ART

Fluid shock absorber struts which are used in a vehicle suspension system often experience a bending moment caused by the offset of the tire contact patch with the roadway from the strut centerline. This offset loading increases the sliding friction between the piston rod and surrounding cylinder, increasing harshness and reducing the life of the shock absorber strut. One of the most commonly used means to counteract this offset loading on a fluid shock absorber strut such as a McPherson strut, is by the use of a system wherein a counter lateral force is exerted on the strut by the use of an offset or angled coil spring surrounding the piston rod and cylinder.

Some examples of prior art suspension systems which attempt to overcome this offset loading problem are shown in the following patents.

U.S. Pat. No. 3,954,257 discloses a suspension system in which the extended end of the piston rod is connected to the underside of an upper spring and bearing assembly positioned within a suitable bracket connecting the suspension system to the vehicle. This suspension unit includes a surrounding helical spring and a rolling flexible diaphragm member connected to a periphery of a housing in which a fluid shock absorber cartridge is mounted with the upper end of the flexible diaphragm being connected to a spring retaining ring.

U.S. Reissue Pat. No. 31,184 discloses another suspension system which attempts to reduce this offset loading problem by the use of an elastomeric mounting arrangement at the extended end of the piston rod in combination with a surrounding coil spring. German patent No. 2,100,338 discloses another suspension system in which the piston rod of a fluid shock absorber is set at an offset angle to match the suspension system in order to counteract the heretofore unbalanced forces exerted hereon.

Another type of vehicle suspension system uses pneumatic springs commonly referred to as air springs in place of fluid shock absorber. In these air springs one or more pistons act within a chamber filled with a pressurized fluid or gas causing compression and expansion of the fluid contained in the pressure chamber, to absorb the road shocks as the pistons move between jounce and rebound positions. Some examples of prior art vehicle air springs are shown in U.S. Pat. Nos. 2,926,011; 2,985,445; 2,978,256; 3,046,000; 3,074,079; and 4,518,154.

Therefore, the need exists for a suspension system using a fluid shock absorber strut in combination with means for offsetting the off center lateral forces exerted on the shock absorber strut. There is no known suspension system of which we are aware which accomplishes this by the combination shock absorber strut/air spring suspension system in which the air spring is provided with means of exerting an offset loading to counteract the bending moment caused by the unbalanced load exerted on the shock absorber strut and without interfering with the tire when in the jounce position.

DISCLOSURE OF THE INVENTION

Objectives of the invention include providing an improved air spring suspension system which uses a usual hydraulic shock absorber strut in combination with an air spring having a flexible sleeve or diaphragm, a predetermined portion of which is surrounded by a rigid cutaway can-like member which will push the sleeve to one side by restricting the expansion of the sleeve in a predetermined direction while permitting the unrestrained portion of the sleeve to expand outwardly due to the internal fluid pressure; and in which the deformation of the flexible sleeve creates an offset loading which when properly placed will counteract the natural offset or lateral forces exerted on the shock absorber strut by the offset vehicle load.

Another objective of the invention is to provide such an improved suspension system in which the flexible sleeve which defines the fluid chamber, can be supplied with various amounts of pressurized fluid to affect expansion and contraction of the chamber and compensate for vehicle loading, and which will eliminate the heretofore required helical suspension spring surrounding the shock absorber strut.

A further objective is to provide such an improved air spring suspension system in which the piston rod of the shock absorber strut is secured to a vehicle mounting bracket by elastomeric bushings to assist in absorbing road forces exerted thereon, in which the piston rod end is mounted in the resilient cushioning member, and in which a compression bumper is located within the fluid chamber of the air spring and is engaged by a bumper stop mounted in a fixed position with respect to the cylinder to prevent damage to the shock absorber strut upon the suspension system experiencing severe compression or jounce position.

A still further objective of the invention is to provide such an improved air spring suspension system in which the amount of retention of the flexible diaphragm portion of the air spring and its location will provide various amounts and directions of lateral loading on the shock absorber strut in order to match the suspension system to a particular vehicle application, and in which the cut-away portion of the retaining can-like member will allow more clearance for the vehicle tire or other vehicle components. Another objective of the invention is to provide a new and improved suspension system which is of a relatively simple design, economical to manufacture, and which will increase the life and effective operation of the shock absorber strut of the suspension system.

These objectives and advantages are obtained by the improved air spring suspension system of the invention, the general nature of which may be stated as including a shock absorber strut having an outer cylinder and a reciprocal piston rod; first attachment means for securing the cylinder to a first vehicle support structure; second attachment means for securing the piston rod to a second vehicle support structure spaced from the first vehicle support structure; a fluid pressure chamber comprising an annular canister mounted against movement relative to the piston rod, and a flexible sleeve sealingly connected to and extending between said canister and cylinder, said pressure chamber adapted to contain a supply of pressurized fluid to effect expansion and contraction of the flexible sleeve, with said piston rod extending through said pressure chamber; and a rigid retention member surrounding a predetermined portion of the flexible sleeve to restrain outward expansion of said sleeve portion to place a lateral force on the shock absorber strut.

BRIEF DESCRIPTION OF THE DRAWINGS

A preferred embodiment of the invention, illustrative of the best mode in which applicants have contemplated applying the principles is set forth in the following description and is shown in the drawings, and is particularly and distinctly pointed out and set forth in the appended claims.

FIG. 8 is a reduced elevational view with portions broken away and in section, similar to FIG. 2, with the suspension system being shown in the rebound or expanded position;

FIG. 9 is an elevational view with portions broken away and in section, similar to FIGS. 2 and 8, with the suspension system being shown in the compressed or jounce position; and FIG. 10 is an enlarged fragmentary sectional view showing the annular band portion of the cutaway can-like member of FIG. 3 in sealing clamping engagement with one end of the flexible sleeve.

Similar numerals refer to similar parts throughout the drawings.

BEST MODE FOR CARRYING OUT THE INVENTION

Figure 2:
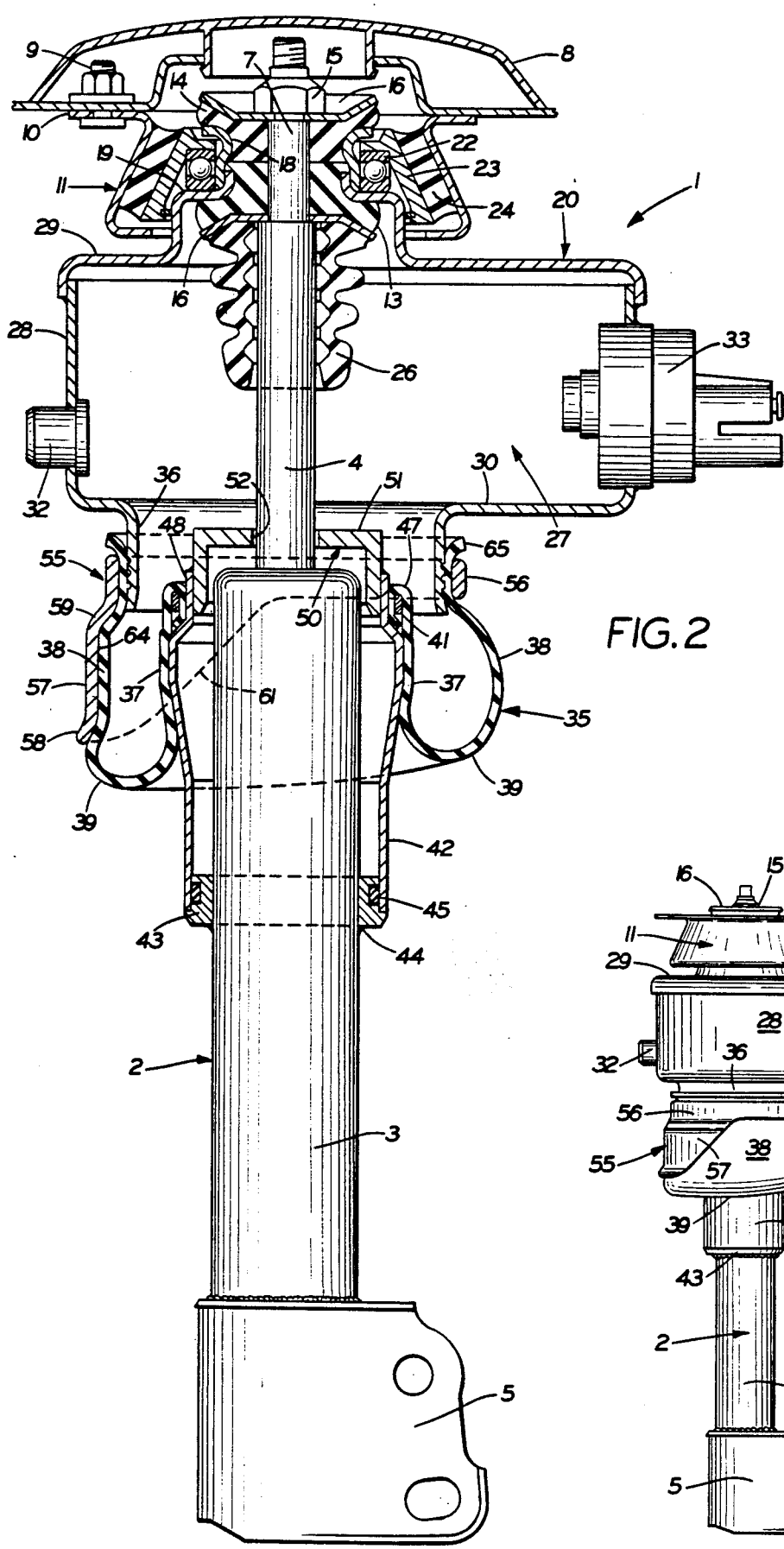
FIG. 2 is an enlarged view similar to FIG. 1 with portions broken away and in section, showing the upper portion of the suspension system attached to the chassis of a vehicle.
Figure 1:
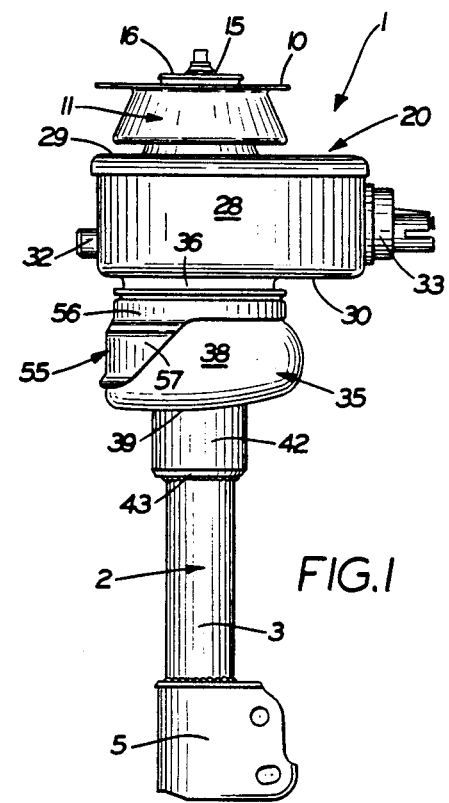
FIG. 1 is a perspective view showing the improved air spring suspension system in elevation.
Figure 3:
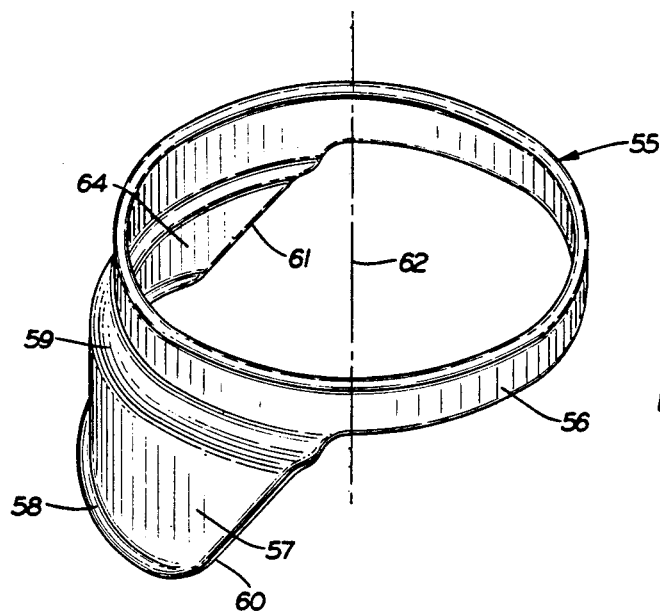
FIG. 3 is a perspective view of the cutaway can-like retention member of the improved suspension system.
Figure 5:
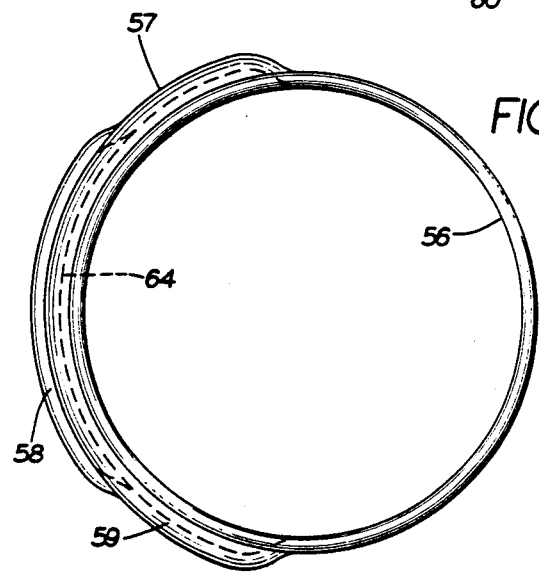
FIG. 5 is a top plan view of the retention member of FIG. 3.
Figure 4:
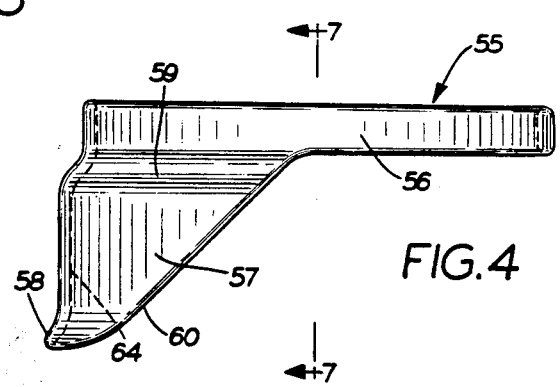
FIG. 4 is a side elevational view of the cutaway retention member of FIG. 3.
Figure 6:
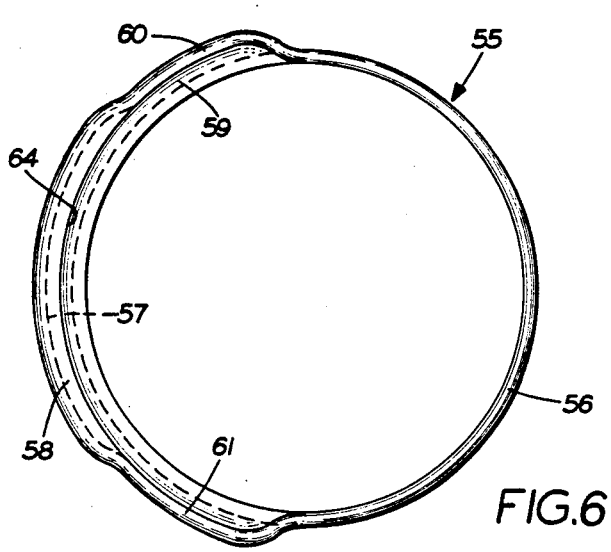
FIG. 6 is a bottom plan view of the retention member of FIG. 3.
Figure 7:
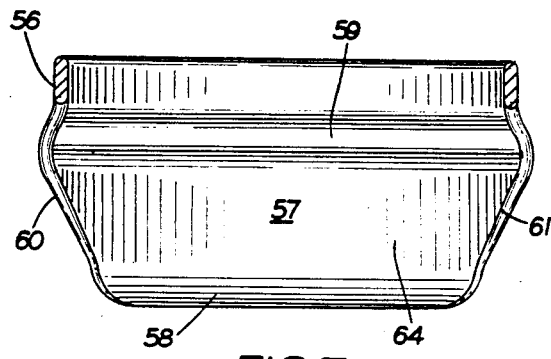
FIG. 7 is a sectional view taken on line 7—7, FIG. 4.

The improved air spring suspension system is indicated generally at 1, and is shown in elevation in FIG. 1 with the components thereof being shown principally in section in FIG. 2. Suspension system 1 includes a usual fluid shock absorber strut, indicated generally at 2, consisting of a cylinder 3 and a piston rod 4 reciprocally mounted therein, having a piston (not shown) located within cylinder 3.

Cylinder 3 is operatively mounted within or upon a wheel spindle or stub axle (not shown) of a vehicle by an attachment bracket 5, the particular mounting arrangement of which is well known in the art. The piston rod upper end 7 is adapted to be operatively connected to an associate portion of a vehicle chassis, indicated at 8, by a plurality of bolts 9 which extends through outer flange portions 10 of an annular mountng cup indicated generally at 11.

Piston rod end 7 extends through a pair of resilient bushings 13 and 14 which are clamped by a nut 15 between a pair of washers 16. Bushings 13 and 14 are bonded to an annular ring bearing mounting ring 18 which is mounted on a stepped upper shoulder 19 of a metal or plastic rigid air spring canister, indicated generally at 20. Lower resilient bushing 13 preferably is bonded to the upper portion of air spring canister 20. An anti-friction bearing ring 22 is seated on stepped shoulder 19 of air spring canister 20 and is secured within a bearing retainer 23 which is bonded to mounting cup 11 by an annular resilient member 24. This mounting arrangement provides a resilient rotatable mount of piston rod 4 to the vehicle chassis.

A resilient annular bumper 26 preferably is bonded to the underside surface of lower washer 16 and is telescopically slidably with respect to the upper end of piston rod 4. Rigid air spring canister 20 forms a major portion of a pressurized air chamber indicated generally at 27, and may include a cylindrical sidewall 28, a top wall 29 having the stepped portion therein through which piston rod 7 extends, and an annular bottom wall 30. A height sensor connector 32 and a solenoid valve 33 may be mounted in openings formed in cylindrical sidewall 28 for controlling the amount of fluid pressure within fluid chamber 27. Rigid canister 20 is mounted against movement with respect to piston rod 4 by its connection with resilient bushing 13 and bearing mounting ring 18.

In accordance with the invention, a flexible sleeve or diaphram, indicated generally at 35, preferably formed of an elastomeric material, is sealingly mounted on an annular boss 36 formed integrally with and extending downwardly from bottom wall 30 of rigid air spring canister 20. Flexible sleeve 35 is of a generally tubular configuration comprising an inner portion 37 and a radially outer portion 38 connected to portion 37 by an integral reversely folded portion 39. The open end of flexible sleeve 35 provided at the end of inner portion 37 is sealingly clamped by a clamping ring 41 to the upper end of an annular sleeve 42. Sleeve 42 is formed of a rigid material and is secured by a collar 43 in a fixed position by welds 44 or the like, to cylinder 3 of strut 2. A sealing o-ring 45 may be mounted between collar 43 and sleeve 42. Rigid sleeve 42 provides an air spring piston for the air spring portion of the improved suspension system. Inturned end 47 of inner portion 37 of flexible sleeve 35 is clamped against a reduced diameter annular portion 48 of sleeve 42.

When referring to sleeve 35 the term flexible means that the sleeve is able to expand and contract outwardly and inwardly due to the resiliency of the rubber material from which it is formed, as the axial spacing between the secured ends thereof changes since the material itself which forms sleeve 35 will have only a very small amount of stretch.

A bumper seat indicated generally at 50, is welded to the interior of reduced end portion 48 of rigid sleeve 42 and has an annular top wall 51 formed with a central opening 52 through which piston rod 4 extends. Top wall 51 is adapted to contact the bottom of annular bumper 26 as shown in FIG. 9 upon the suspension system reaching a severe jounce position to reduce injury to strut 2.

In accordance with the invention, a rigid cutaway can-like member, indicated generally at 55 (FIGS. 3–7), is mounted in a fixed position on the lower end of annular boss 36 of air spring canister 20 (FIGS. 2, 8, and 9). Cutaway member 55 preferably is an integral one piece component having an annular clamping band 56 and an axially extending sidewall 57 which terminates in a smooth outturned bottom flange 58. Side wall 57 is connected to band 56 by a smooth stepped annular shoulder 59. Preferably sidewall 57 terminates in a pair of edges 60 and 61 which are at an angle with respect to a centerline axis 62 of annular band 56 and sidewall 57. Preferably sidewall 57 has a smooth concave inner surface 64 and will extend throughout an arcuate length of between 90 degrees and 180 degrees in order to achieve the most efficient results. As shown in FIG. 10, clamping band 56 sealingly clamps open top end 65 of outer sleeve portion 38 against the annular bottom edge of annular boss 36 of rigid air spring canister 20.

FIG. 2 illustrates the improved air spring suspension system in a normal at-rest position in which a predetermined area of outer radial portion 38 of flexible sleeve 35 extends along and is restrained against outward expansion by sidewall 57 of cutaway can member 55 with the unrestrained area of outer sleeve portion 38 bulging outwardly by the internal pressure within chamber 27, as shown by the right-hand portion thereof in FIG. 2. The internal pressure of the fluid within chamber 27 will force the inner portion 37 of flexible sleeve 35 against the walls of rigid annular sleeve 42. This restrained portion of flexible sleeve 35 in combination with the predetermined unrestrained portion thereof will cause a lateral or offset force to be applied to strut 2 to counteract against the offcenter mounting of the strut. Solenoid valve 33 will maintain the desired amount of fluid pressure within the pressurized fluid chamber formed by air spring canister 20 and flexible sleeve or diaphram 35.

Upon the vehicle wheel encountering a depression in the roadway, the suspension system will assume a rebound position as shown in FIG. 8, in which cylinder 3 will move downwardly with respect to vehicle chassis 8 unrolling folded portion 39 of flexible sleeve 35. Sidewall 57 of cutaway can member 55 prevents a predetermined portion of the flexible sleeve from bowing outwardly as occurs on the unrestrained portion thereof. This retention of a portion of the flexible sleeve or pressure diaphragm will push the pressurized sleeve to one side as illustrated by arrow A in FIG. 8, exerting a lateral force on the piston rod with respect to the cylinder counteracting the usual offset loading thereon.

Upon the vehicle tire encountering a projection in the roadway, the air spring suspension system will move to a jounce position as shown in FIG. 9 in which the air spring piston provided by annular sleeve 42 will move upwardly into pressurized fluid chamber 27, and in combination with the damping and resistance provided by strut 2 will absorb most of the shock and load applied to the vehicle chassis. If a severe projection is encountered by the vehicle wheel, bumper seat 50 may move further upwardly as shown in dot-dash lines in FIG. 9 greatly collapsing resilient bumper 26 preventing damage to the strut. Again, in the jounce position of FIG. 9, the restrained portion of flexible sleeve 35 in combination with the unrestrained portions thereof will produce the offset lateral forces to counteract the unbalance forces occurring on strut 2.

Accordingly, the improved air spring suspension system is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding: but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries, and principles of the invention, the manner in which the improved air spring suspension system is constructed and used, the characteristics of the construction, and the advantageous, new and useful results obtained; the new and useful structures, devices, elements, arrangements, parts, and combinations, are set forth in the appended claims.

What is claimed is:

1. An improved air spring suspension system for vehicle including:
   (a) a fluid shock absorber strut having an outer cylinder and a reciprocal piston rod;
   (b) first attachment means for securing the cylinder to a first vehicle support system;
   (c) second attachment means for securing the piston rod to a second vehicle support structure spaced from the first vehicle support structure;
   (d) a fluid pressure chamber comprising an annular canister mounted against movement relative to the piston rod, and a flexible sleeve sealingly connected to and extending between said canister and cylinder, said pressure chamber adapted to contain a supply of pressurized fluid with said piston rod extending through said pressure chamber; and
   (e) a rigid retention member having a sidewall surrounding a predetermined portion of the flexible sleeve to restrain outward expansion of a first sleeve portion while permitting free expansion of a second sleeve portion to place a lateral force on the shock absorber strut.

2. The air spring defined in claim 1 in which the pistion rod is rotatably connected to said second attachment means.

3. The air spring defined in claim 1 in which valve means controls the flow of pressurized fluid into the pressure chamber.

4. The air spring defined in claim 1 in which the flexible sleeve is connected to the cylinder by a rigid sleeve which surrounds the cylinder; and in which one end of said rigid sleeve is sealingly connected to the cylinder and the other end is sealingly connected to an end of the flexible sleeve.

5. The air spring defined in claim 4 in which a bumper seat is mounted on said other end of the rigid sleeve.

6. The air spring defined in claim 5 in which an elastomeric bumper is telescopically mounted about the piston rod and is engaged by the bumper seat upon the piston rod reaching a predetermined reciprocated position within the cylinder.

7. The air spring defined in claim 1 in which the rigid retention member includes the sidewall and an annular band which sealingly connects an end of the flexible sleeve to the annular canister, and in which the sidewall is curved having a smooth concave inner surface engageable with the predetermined portion of the flexible sleeve.

8. The air sleeve defined in claim 7 in which the curved sidewall and annular band of the rigid retention member form an integral one piece member; and in which the sidewall terminates in an outwardly flared end opposite of the annular band.

9. The air spring defined in claim 7 in which the curved sidewall has an arcuate length of between 90 degrees and 180 degrees.

10. The air spring defined in claim 7 in which the curved sidewall terminates in a pair of side edges which extend at an angle with respect to a centerline axis of the annular band.

11. The air spring defined in claim 7 in which the annular band is integrally connected to the curved sidewall by a stepped shoulder.

12. The air spring defined in claim 1 in which the flexible sleeve is formed of an elastomeric material and has radially spaced inner and outer portions connected by an integral reversely folded rolling portion, said outer portion being partially surrounded by the rigid retention member and said inner member being connected to the cylinder by a rigid annular sleeve telescopically extending about and secured at one end to said cylinder.

13. The air spring defined in claim 12 in which the folded rolling portion of the elastomeric sleeve extends beyond an outer edge of the rigid retention member.

14. The air spring in claim 1 in which the annular canister is secured to the piston rod by an elastomeric mount.

15. An air spring in combination with a vehicle suspension strut of the type having a cylinder and a piston rod, and attachment means securing said cylinder to one portion of the vehicle and said piston rod to another portion of said vehicle, for cushioning loads during suspension jounce and rebound, said air spring including:

(a) a flexible diaphragm surrounding a portion of the strut and defining a fluid chamber adapted to contain a supply of pressurized fluid; said diaphragm being operatively connected at one end to the piston rod and at another end to the cylinder and expandable outwardly by the pressurized fluid; and (b) rigid wall means partially surrounding a predetermined portion of the flexible diaphragm for restraining outward expansion of a first predetermined portion of the flexible diaphdragm and allowing outward expansion of a second predetermined portion of the flexible diaphragm causing a lateral force to be exerted on the strut.

16. The combination defined in claim 15 in which the flexible diaphragm has radially spaced inner and outer portions connected by an integral reversely folded rolling portions, said outer portion being connected to the restraining means and said inner portion being connected to the cylinder.

17. The combination defined in claim 16 in which the rigid wall restraining means is an integral rigid member having an annular band which clamps the outer portion of the flexible diaphragm against movement relative to the pistion, and a curved sidewall portion which extends about and contacts a portion of said outer portion which is the said first predetermined portion of the flexible diaphragm restrained by the restraining means.

18. The combination defined in claim 16 in which the inner portion of the flexible diaphragm is sealingly clamped against an annular end of a rigid sleeve, with another end of said rigid sleeve being secured to the cylinder.

19. The combination defined in claim 17 in which the annular band of the restraining means clamps the flexible diaphragm against a rigid annular canister mounted on and extending about the pistion rod and defining a portion of the fluid chamber.

20. The combination defined in claim 16 in which the inner portion of the flexible diaphram extends along and is in contact with the rigid sleeve when the suspension strut is in the jounce position.

* * * * *